(12) United States Patent
Davies et al.

(10) Patent No.: US 10,037,482 B2
(45) Date of Patent: Jul. 31, 2018

(54) ADAPTIVE POWER STATES IN A DISTRIBUTED RASTER IMAGE PROCESSING ENVIRONMENT

(71) Applicant: Xerox Corporation, Norwalk, CT (US)

(72) Inventors: Kenneth A. Davies, El Camino Village, CA (US); Andrew Piecka, III, North Hollywood, CA (US); Jesus Rodriguez, Downey, CA (US)

(73) Assignee: Xerox Corporation, Norwalk, CT (US)

( * ) Notice: Subject to any disclaimer, the term of this patent is extended or adjusted under 35 U.S.C. 154(b) by 131 days.

(21) Appl. No.: 15/294,863

(22) Filed: Oct. 17, 2016

(65) Prior Publication Data

US 2018/0107905 A1    Apr. 19, 2018

(51) Int. Cl.
*G06F 3/12* (2006.01)
*G06K 15/00* (2006.01)
*G06K 15/02* (2006.01)

(52) U.S. Cl.
CPC ....... *G06K 15/1823* (2013.01); *G06K 15/184* (2013.01); *G06K 15/1817* (2013.01); *G06K 15/4055* (2013.01); *G06K 15/4065* (2013.01)

(58) Field of Classification Search
CPC . G06F 3/1221; G06F 3/1229; G06K 15/1823; G06K 15/4065; G06K 15/4055; G06K 15/184; G06K 15/1817
See application file for complete search history.

(56) References Cited

U.S. PATENT DOCUMENTS

| | | | |
|---|---|---|---|
| 6,072,585 A | 6/2000 | Dutton et al. | |
| 6,961,141 B2 | 11/2005 | Szumla | |
| 7,072,052 B1 | 7/2006 | Tanahashi et al. | |
| 7,612,919 B2 | 11/2009 | Takahashi | |
| 8,115,949 B2 | 2/2012 | Toda | |
| 8,508,752 B2 | 8/2013 | Torii | |
| 8,634,086 B2 | 1/2014 | Boeck et al. | |
| 8,817,292 B1 | 8/2014 | Rodriguez et al. | |
| 9,025,194 B2 * | 5/2015 | Ueda | G06F 1/3228 358/1.16 |
| 2006/0067592 A1 | 3/2006 | Walmsley et al. | |
| 2008/0130035 A1 | 6/2008 | Smith | |
| 2010/0271656 A1 | 10/2010 | Morales et al. | |
| 2012/0155945 A1 * | 6/2012 | Ogushi | B41J 29/38 400/76 |

* cited by examiner

*Primary Examiner* — Eric A Rust
(74) *Attorney, Agent, or Firm* — Gibb & Riley, LLC

(57) ABSTRACT

Raster image processing computer devices buffer pages of print-ready bitmaps waiting to be printed by a printing engine. A computer device monitors the printing speed of the printing engine and estimates the processing time for the raster image processing computer devices to produce the print-ready bitmaps, based on the complexity of the pages of the print job. The computer device compares the printing speed to the processing time to predict whether the number of pages of the print-ready bitmaps buffered by the raster image processing computer devices will increase or decrease. The computer device places one or more of the raster image processing computer devices in a reduced-power sleep mode when the number of pages of the print-ready bitmaps buffered is between a buffer minimum and a buffer maximum, and is predicted to not decrease.

20 Claims, 5 Drawing Sheets

ADAPTIVE POWER STATES IN A DISTRIBUTED RASTER IMAGE PROCESSING ENVIRONMENT

BACKGROUND

Systems and methods herein generally relate to providing adaptive power states in a distributed raster image processing environment.

Continuous feed printers operate at high speed and require very powerful groups of computers to process data, which allows the printers to print without stopping. Specialization of roles of processing devices improves efficiency by distributing work between multiple computers, and such systems are sometimes referred to as a "distributed DFE" (where DFE is used for digital front end).

The distributed DFE has resulted in a useful model with the following features. A frontend computer runs a user interface and processes all gateways to and from host computers submitting and getting print jobs and printer status requests. Raster image processing computers (sometimes referred to as "farmhands") rasterize the output into printer compatible output (e.g., bitmaps or rasterized video). These raster image processing computers have the most processing intensive workload. Additionally, backend computers manage the transfer of the rasterized video data to the printer. Maintaining all such individual computers in a full-power, ready state results in substantial electrical supply and cooling costs and may not always be necessary.

SUMMARY

A printing system herein includes, among other devices, a printing engine, frontend and backend computer devices electrically connected to the printing engine, and raster image processing computer devices electrically connected to the frontend and backend computer devices. The frontend computer device receives print jobs from host computer devices and provides pages of the print job to the raster image processing computer devices for decomposition to print-ready bitmaps.

The backend computer device supplies the print-ready bitmaps to the printing engine. The raster image processing computer devices buffer pages of the print-ready bitmaps waiting to be printed by the printing engine. The raster image processing computer devices comprise dedicated computer devices that only produce the print-ready bitmaps and that are separate from the frontend computer device and the backend computer device. The frontend computer device monitors the current printing speed of the printing engine, and estimates the future printing speed based on the current printing speed, scheduled printing supply replacement, and scheduled employee availability.

Also, the frontend computer estimates the processing time for the raster image processing computer devices to produce the print-ready bitmaps, based on the complexity of the pages of the print job. The frontend computer device performs such estimation of the processing time for the raster image processing computer devices to produce the print-ready bitmaps, for example, by: evaluating the number and complexity of commands that will be processed to produce the print-ready bitmaps; evaluating the current rate at which the raster image processing computer devices are producing the print-ready bitmaps; evaluating page size, page resolution, bandwidth used to transmit pages, resources used for each page, and bit depth; etc., and in such processing weights image commands, color profile adjustments, and image artifact corrections, as being more complex than vectors and graphics commands.

The frontend computer device compares the printing speed to the processing time to predict whether the number of pages of the print-ready bitmaps buffered by the raster image processing computer devices will increase or decrease, and also compares the number of pages of the print-ready bitmaps buffered by the raster image processing computer devices to a buffer minimum and a buffer maximum. The frontend computer device then places one or more of the raster image processing computer devices in a reduced-power sleep mode when the number of pages of the print-ready bitmaps buffered is between the buffer minimum and the buffer maximum, and is predicted to not decrease.

The frontend computer device places additional raster image processing computer devices in the reduced-power sleep mode when the number of pages of the print-ready bitmaps buffered exceeds the buffer maximum, and is predicted to not decrease. Additionally, the frontend computer device returns one or more of the raster image processing computer devices that are in the reduced-power sleep mode to a full-power mode when the number of pages of the print-ready bitmaps buffered is predicted to decrease.

Various methods herein receive print jobs from host computer devices into a processor, provide pages of the print job to raster image processors for decomposition to print-ready bitmaps, buffer pages of the print-ready bitmaps waiting to be printed by a printing engine, and supply the buffered print-ready bitmaps to the printing engine. These methods monitor the current printing speed of the printing engine, and estimate the future printing speed based on the current printing speed, scheduled printing supply replacement, and scheduled employee availability.

Such methods also estimate the processing time for the raster image processors to produce the print-ready bitmaps, based on the complexity of the pages of the print job, using the processor. More specifically, the methods herein estimate such processing time by evaluating the number and complexity of commands that will be processed to produce the print-ready bitmaps; evaluating the current rate at which the raster image processors are producing the print-ready bitmaps; and evaluating page size, page resolution, bandwidth used to transmit pages, resources used for each page, and bit depth. Further, such evaluations weight image commands, color profile adjustments, and image artifact corrections, as being more complex than vectors and graphics commands.

These methods compare the printing speed of the printing engine to the processing time to predict whether the number of pages of the print-ready bitmaps buffered by the raster image processors will increase or decrease; and compare the number of pages of the print-ready bitmaps buffered by the raster image processors to a buffer minimum and a buffer maximum, using the processor. Thus, the methods herein place one or more of the raster image processors in a reduced-power sleep mode when the number of pages of the print-ready bitmaps buffered is between the buffer minimum and the buffer maximum, and is predicted to not decrease, using the processor.

Further, such methods place additional raster image processors in the reduced-power sleep mode when the number of pages of the print-ready bitmaps buffered exceeds the buffer maximum, and is predicted to not decrease, using the processor. Correspondingly, these methods return one or more of the raster image processors that are in the reduced-power sleep mode to a full-power mode when the number of pages of the print-ready bitmaps buffered is predicted to decrease, using the processor.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
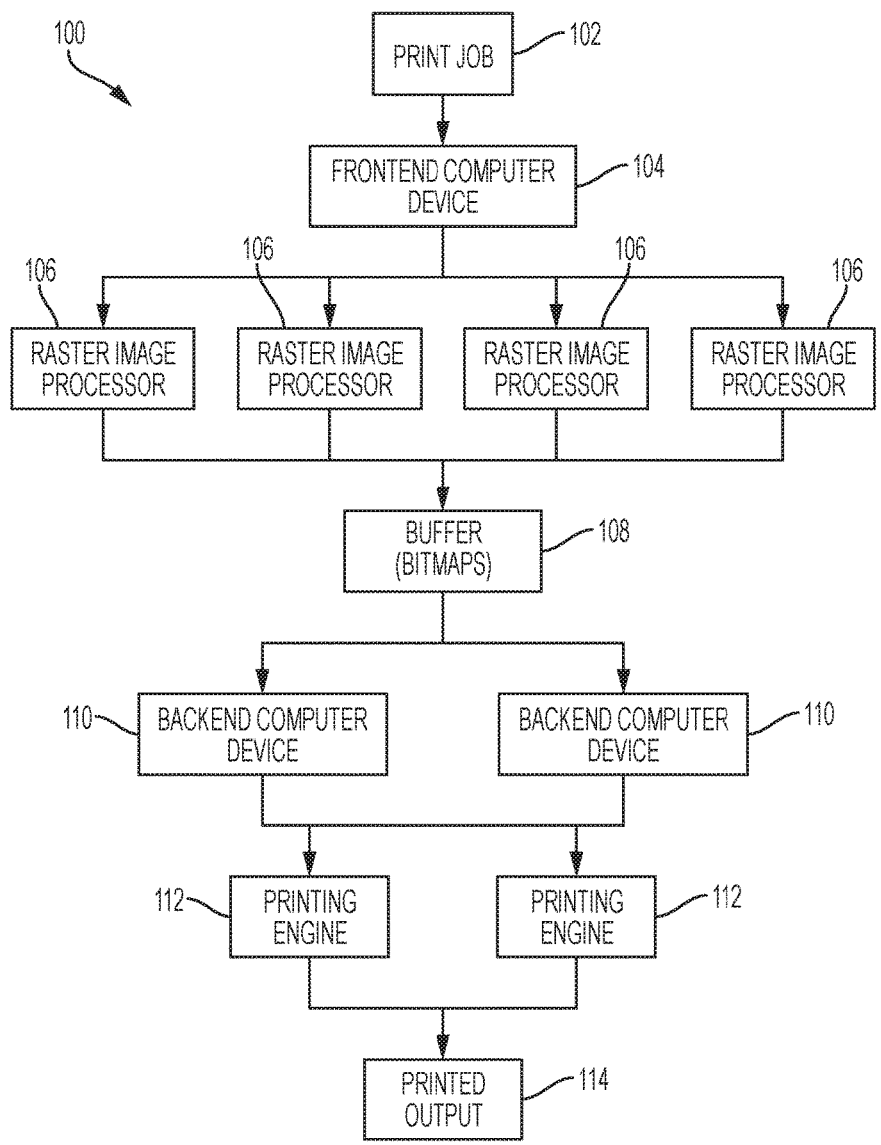
FIG. 1 is a schematic diagram illustrating distributed digital front end systems herein.

As mentioned above, maintaining all individual computers of a distributed digital front end (DFE) in a full-power, ready state (potentially unnecessarily) results in a substantial amount of electrical supply and cooling costs. Therefore, the systems and methods herein save electrical and cooling costs by placing certain computers into low power or sleep mode based on the processing requirements of the distributed DFE.

More specifically, the methods and systems herein determine the processing requirements by parsing the incoming data of the print job and assigning a page complexity value to the pages of the print job. These methods and systems use the read-ahead value supplied by the image processing gateway, the speed of raster image processing required, the operating speed of the decomposers, how many pages the decomposers are ahead of the printer, and the current printer speed and state.

In one example, there are physical and logical parts of this system. Physically there are frontend computer(s), farmhand computer(s), and backend computer(s). The frontend computer(s) run the customer user interface, are the main network interface for the input gateways, and are master controllers over the other computers. The farmhands are dedicated to only performing raster image processing. The backend computer(s) are dedicated to transferring the rasterized pages to the print device.

The logical units include an input gateway, decomposers, and a backend or printer control. The input gateway communicates with an external host computer, and the input gateway parses the incoming data stream to break it into logical pages. The input gateway processes data at a much higher rate than the decomposers. The decomposers are dedicated raster image processes on the farmhands. These convert the commands and combine the resources to create a printer compatible bitmap of the logical page to be placed on the paper by the printer. The backend computers and the printer place the rasterized logical page onto the paper. When printed pages are placed into the output tray, the backend computer(s) communicate messages such as success, page stacked, etc., back through the system to the input gateway and the host.

The input gateway has a read-ahead buffer value that allows the input gateway to receive incoming data and perform raster image processing ahead (e.g., buffer) a certain number of logical pages in the job. The input gateway read-ahead setting is generally static and allows the distributed DFE to rip ahead a certain number of pages into a job, and never print a physical page.

This buffering process allows the input gateway and decomposers to get ahead of the printer, but such may be inefficient because the print jobs are streaming jobs, and have an unknown length. Raster image processing too far ahead may reduce the ability of the host computer to fast forward or rewind the data stream from control of the host. This situation also makes job recovery more difficult if there are software errors, etc. If the DFE must be restarted due to an error, the amount of read-ahead is lost.

The systems and methods herein use at least two power states for the farmhands based on the expected rate of decomposition. The input gateway rates the incoming page complexity, and this value is used as a comparison of the job ripping and printing on the DFE. If the decomposers have ripped far enough ahead of the printer, then a signal is sent to some of the farmhands that they can stop ripping pages and enter a sleep mode. If the page complexity increases, then a wake command is sent to the farmhands so they can resume ripping pages.

Page complexity is a score of how difficult the page will be for the decomposers to raster image process the print job pages into printer page layout. This score is a result of combining the rating of how many commands and how complex a command may be to create the document, and weighting the command within a command group, and additional weighting for post image creation adjustments for color profiles and artifact adjustments.

For example, the following are used in the page rating calculations from data provided to the input gateway: logical page dimensions and resolution information is provided by the imposition layout and paper sizes information advertised to the host; bandwidth used to transmit the logical page by measuring the amount of time to transmit the logical page from begin and end page commands; the resources used for each logical page (e.g., number of fonts images, transparencies, overlays, graphic and text functions, etc); etc.

For image and object container content, the presentation area, the size of the image, and the bit depth are included in the complexity calculations. Object containers may contain any size up to full-page images files, which can be very complex. For this reason, image commands are given higher score weightings compared to other commands like drawing vector graphics, or font or barcode commands. The weightings in the command groups are multipliers of the commands. For example, there are several types of write image commands, and each of these commands may have their own value of complexity, and this is combined with image group weighting to arrive at a more consistent page complexity rating. Although there is a speed difference depending upon the input print commands, they produce a bitmap that is not necessarily complete for acceptable final output. The bitmap created by the input commands may need to be further adjusted to change the final hue and shade of the colored areas, and certain types of image creation could result in final print artifacts that are undesirable. These adjustments may or may not be added for a given print job, and in a system running print jobs back to back, the application of these adjustments may or may not occur throughout the work day. It is quite possible that these final adjustments could take significant additional time beyond the original creation of the bitmap from the print commands. The weighting factors reflect this additional complexity that affects the overall throughput of the decomposers.

Using these factors the methods and systems herein estimate the page complexity and the amount of workload for the decomposers. For example, a logical page with larger size (with many graphic image type placements, rotations, colors and fonts) will have a complexity score higher score than a smaller size page with simpler layout. The methods and systems herein data mine the above-mentioned information provided by the input gateway, and store such in a table using a logical page number, to record the complexity score of each page. This table is later compared to the actual page per minute raster image processing speed of the decomposers.

The decomposers populate the table with the raster image processing speed for the matching logical page. From this table, when more logical pages are received and processed by the input gateway, the page information is compared in the table, and this is used as an estimate for the expected raster image processing time of the pages. If the jobs complexity changes (increases or decreases) the input gateway page complexity score rises or falls. Additionally, the estimated metric data of the input gateway page complexity score is compared to the actual page per minute raster image processing speed to fine tune the raster image processing rate. This information is used to provide an estimate of average raster image processing rate for all the active farmhands (the predicted work rate). This is compared to what is required by the current printer rate because, generally, the printer print speed is constant in pages per minute, against the current workload.

FIG. 1 illustrates a generic distributed DFE printing system 100 that includes, among other devices, a printing engine 112, frontend and backend computer devices 104, 110 electrically connected to the printing engine 112, and raster image processing computer devices 106 electrically connected to the frontend and backend computer devices 104, 110. The frontend computer device 104 receives print jobs 102 from host computer devices and provides pages of the print job 102 to the raster image processing computer devices 106 for decomposition to print-ready bitmaps.

Those ordinarily skilled in the art would understand that FIG. 1 is a dramatically oversimplified diagram of what is, in reality, a much more complex system. Therefore, while a limited number of individual printers 112, an individual frontend computer devices 104, and two individual backend computer devices 110, etc., are shown in FIG. 1, each of these could, in practice, be single machines, or many more independent machines than shown. Similarly, while a limited number of raster image processing computer devices 106 are illustrated; those skilled in the art would understand that, typically, there would be a larger number of such devices within a distributed DFE system 100 than shown. FIG. 1 is intentionally oversimplified in order to maintain the reader's focus upon the salient features relating to placing the raster image processors 106 into sleep mode when specific conditions exist, as described below.

The raster image processing computer devices 106 comprise dedicated, individual, stand-alone computer devices that only produce the print-ready bitmaps (and perform no other activity) and are physically separate machines from the frontend computer device 104 and the backend computer device 110. The backend computer device 110 supplies the print-ready bitmaps to the printing engines 112 to have the printing engines produce printed output 114. The raster image processing computer devices 106 buffer pages 108 of the print-ready bitmaps waiting to be printed by the printing engine 112. Note that the buffer 108 is shown separately from the raster image processors 106 and backend computer devices 110 in FIG. 1 to represent that the raster image processors 106 and/or the backend computer devices 110 can buffer the bitmaps or a physically separate storage can buffer the bitmaps. In other words, buffer 108 can be within the raster image processors 106 and/or the backend computer devices 110, or can be one or more separate machines physically separate therefrom.

The frontend computer device 104 monitors the current printing speed of the printing engine 112, and estimates the future printing speed based on the current printing speed, scheduled printing supply replacement, and scheduled employee availability. Therefore, the front end computer device 104 monitors when the printing engine 112 will be idle, such as when printing supplies (printing paper, toner, ink, etc.) will be replaced, when scheduled maintenance and cleaning processes will occur, when employee breaks (or non-working hours) will occur, etc. This allows the front end computer device 104 to know not only how fast the printing engine 112 will print when it is printing, but also to know when the printing engine 112 will be idle and not performing any printing activities (will be printing at zero pages per minute).

Also, the frontend computer device 104 estimates the processing time for the raster image processing computer devices 106 to produce the print-ready bitmaps, based on the complexity of the pages of the print job 102. The frontend computer device 104 performs such estimation of the processing time to produce the print-ready bitmaps, for example, by: evaluating the number and complexity of commands in the print job that will be processed to produce the print-ready bitmaps; evaluating the current rate at which the raster image processing computer devices 106 are producing the print-ready bitmaps from the print job; evaluating page size, page resolution, bandwidth used to transmit pages, resources used for each page, and bit depth; etc., and in such processing weights image commands in the print job as being more complex than vectors and graphics commands, plus any additional weight for color profile adjustments or artifact adjustment to be made after image bitmap creation in the print job.

The frontend computer device 104 compares the printing speed (including any periods when the printer will be idle) to the processing time to predict whether the number of pages of the print-ready bitmaps in the buffer 108 will increase or decrease. Therefore, the systems and methods herein dynamically predict whether the number of pages of print-ready bit maps within the buffer 108 will increase or decrease based upon whether the raster image processors 106 will be supplying print ready bitmaps to the buffer 108 at a greater or lesser rate than the backend computer device 110 will be removing the bitmaps from the buffer 108 to supply the print-ready bit maps to the printing engines 112.

Thus, if the printing engine 112 is predicted to be idle, because of an upcoming employee break for example, and the raster image processing computer devices 106 are predicted to continue to produce bitmaps, the number of bitmaps within the buffer 108 will be predicted to increase. To the contrary, if the raster image processing computer devices 106 are not producing any bitmaps (e.g., because all raster image processing computer devices 106 are in low-power sleep mode) while the printing engine 112 is printing, the number of bitmaps within the buffer 108 will necessarily decrease. Situations between these two extremes will either increase or decrease the number of bitmaps within the buffer 108 based upon the difference between the predicted printing rate and the predicted production rate of print-ready bit maps.

The frontend computer device 104 also compares the number of pages of the print-ready bitmaps buffered 108 by the raster image processing computer devices 106 to a buffer minimum and a buffer maximum. The frontend computer device 104 can then place one or more of the raster image processing computer devices 106 in a reduced-power sleep mode when the number of pages of the print-ready bitmaps buffered is between the buffer minimum and the buffer maximum, and is predicted to not decrease.

The raster image processing computer devices 106 operate in a full-power mode when producing bitmaps, and the reduce-power sleep mode consumes less than 50% of the power consumed in the full-power mode (and may consume substantially less, such as 10%, 8%, 4%, of the power consumed in full-power mode etc.). For example, when in reduced-power sleep mode, the raster image processing computer devices 106 may only supply power to limited circuitry that looks for wake-up signals that call the raster image processing computer devices 106 to return to the full-power mode, and circuitry necessary to initialize the wake-up procedure, while power is not supplied to any other circuitry or devices (such as processors, cooling equipment, storage devices, etc.). In addition, such limited circuitry can be operated on battery power to reduce external power draw to zero during sleep mode.

If, after placing one or more of the raster image processor computer devices 106 in the low-power sleep mode, the frontend computer device 104 determines that the number of pages of print-ready bitmaps buffered is still predicted to not decrease (e.g., still predicted to increase) the frontend computer device 104 can place one or more additional raster image processor computer devices 106 in low-power sleep mode, until the number of pages of print-ready bitmaps buffered is predicted to decrease (at which point no more raster image processor computer devices 106 are placed in low-power sleep mode). Also, the frontend computer device 104 places additional raster image processing computer devices 106 in the reduced-power sleep mode when the number of pages of the print-ready bitmaps buffered exceeds the buffer maximum, and is still predicted to not decrease. Additionally, the frontend computer device 104 returns one or more of the raster image processing computer devices 106 that are in the reduced-power sleep mode to the full-power mode when the number of pages of the print-ready bitmaps buffered is predicted to decrease.

Thus, the devices herein allow at least some of the raster image processors to proceed to reduced-power mode based on the predicted complexity of the upcoming pages of the print job that are to be rasterized. This reduces the amount of power that is consumed by the devices and the cooling equipment. This also extends the useful life of the raster image processors and cooling equipment by reducing the number of hours such devices are fully powered in an on state.

Figure 2:
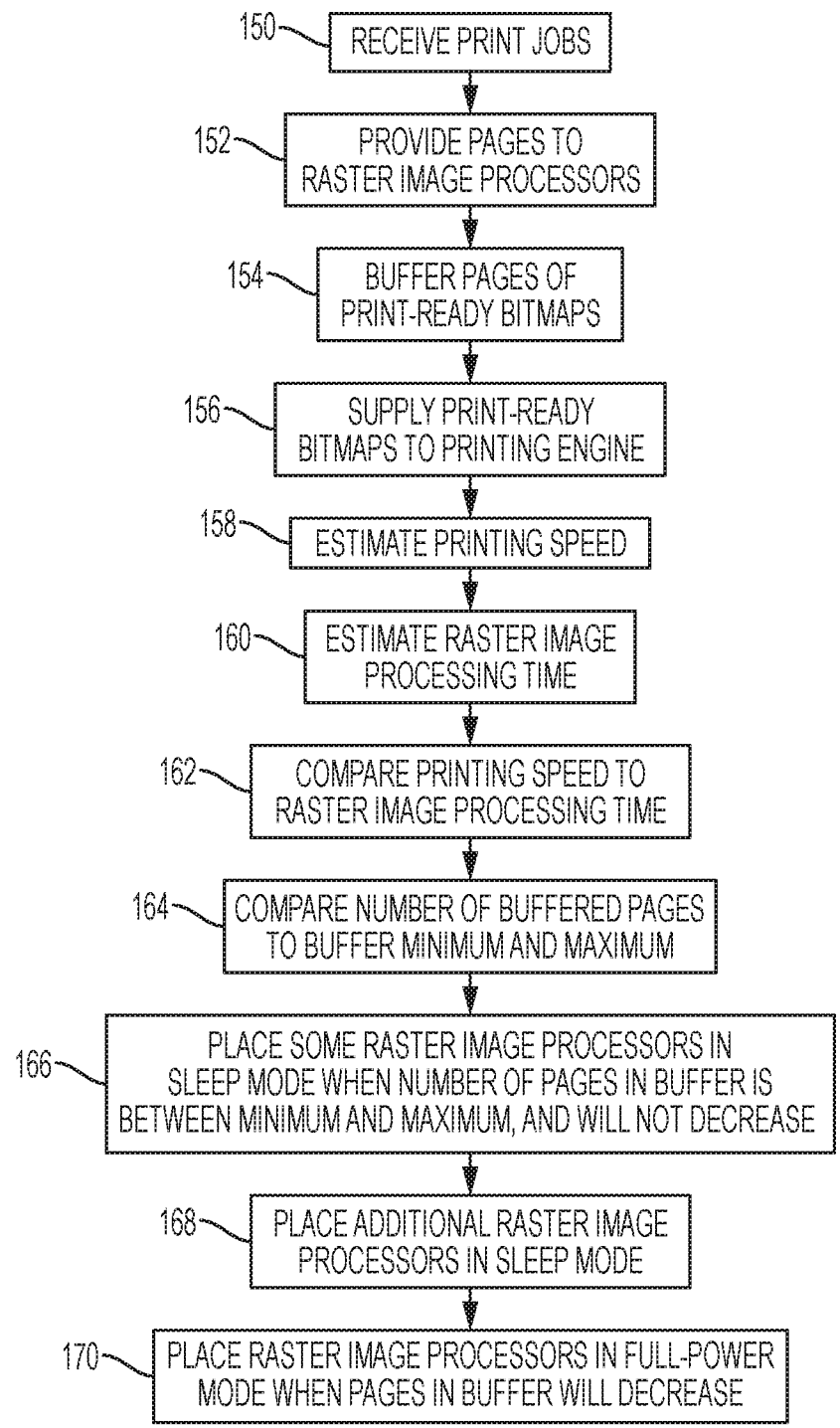
FIG. 2 is a flow diagram of various methods herein.
Figure 3:
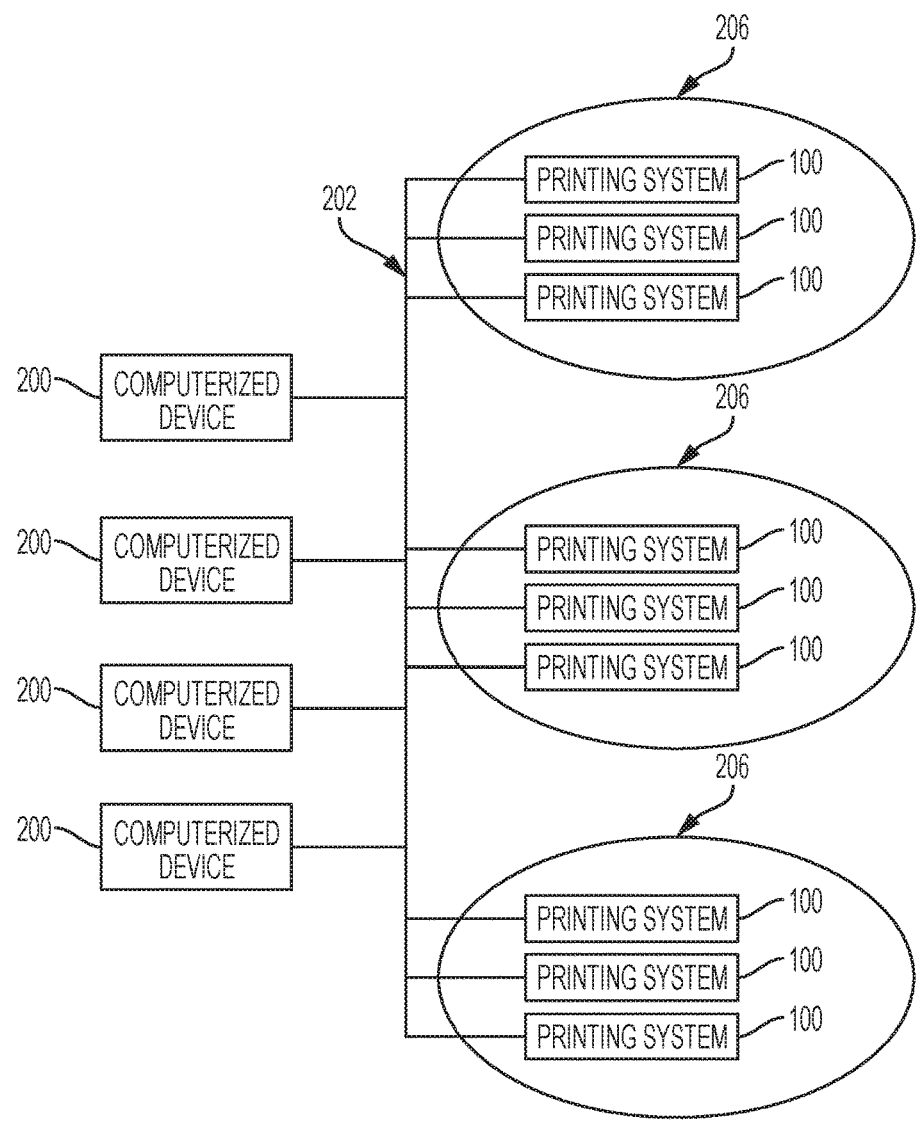
FIG. 3 is a schematic diagram illustrating systems herein.

FIG. 2 is flowchart illustrating exemplary methods herein. In item 150, these methods receive print jobs from host computer devices into a processor (e.g., frontend computer device). For example, as shown in FIG. 3 (described below), the print job may be transmitted from a remote computer 200, over a network 202, to one of the printing systems 100, discussed above.

In item 152 of FIG. 2, these methods automatically provide pages of the print job to raster image processors for decomposition to print-ready bitmaps. These methods automatically buffer pages of the print-ready bitmaps waiting to be printed by the printing engine in item 154. In turn, in item 156, such methods automatically supply the buffered print-ready bitmaps to a printing engine, which automatically prints the bitmaps on print media.

As shown in item 158, such methods automatically monitor the current printing speed of the printing engine, and estimate the future printing speed based on the current printing speed, scheduled printing supply replacement, and scheduled employee availability.

In item 160, such methods also automatically estimate the processing time for the raster image processors to produce the print-ready bitmaps in item 160. The processing time estimation performed in item 160 is based on the complexity of the pages of the print job. More specifically, in item 160, the methods herein estimate such raster image processing time by evaluating the number and complexity of commands in the print job that will be processed to produce the print-ready bitmaps; evaluating the current rate at which the raster image processors are producing the print-ready bitmaps; and evaluating page size, page resolution, bandwidth used to transmit pages, resources used for each page, and bit depth. Further, such evaluations in item 160 weight image commands as being more complex than vectors and graphics commands, plus additional weight for color profile adjustments and artifact adjustments after bitmap creation.

In item 162, these methods automatically compare the printing speed of the printing engine to the processing time to predict whether the number of pages of the print-ready bitmaps buffered by the raster image processors will increase or decrease. In other words, in item 162, if the raster image processors are producing print-ready bitmaps faster than the printing engine is printing the print-ready bit maps, the number of print-ready bit maps within the buffer will increase. To the opposite, in item 162, if the raster image processors are producing print-ready bitmaps slower than the printing engine is printing the print-ready bit maps, the number of print-ready bit maps within the buffer will decrease.

In item 164, the methods herein automatically compare the number of pages of the print-ready bitmaps buffered by the raster image processors to a buffer minimum and a buffer maximum, using the processor. Thus, in item 166, the methods herein automatically place one or more of the raster image processors in a reduced-power sleep mode when the number of pages of the print-ready bitmaps buffered is between the buffer minimum and the buffer maximum, and when the number of pages of the print-ready bitmaps buffered is predicted to not decrease, using the processor. Therefore, as shown in item 166, the systems and methods herein dynamically place raster image processors in a reduced-power mode based upon whether the raster image processors will be supplying print ready bitmaps to the buffer at a greater or lesser rate than the backend computer device will be removing the bitmaps from the buffer to supply the print-ready bit maps to the printing engine.

If, after placing one or more of the raster image processor computer devices in the low-power sleep mode in item 166, the frontend computer device determines that the number of pages of print-ready bitmaps buffered is still predicted to not decrease (e.g., still predicted to increase) the frontend computer device can automatically place one or more additional raster image processor computer devices in low-power sleep mode in item 168, until the number of pages of print-ready bitmaps buffered is predicted to decrease (at which point no more raster image processor computer devices are placed in low-power sleep mode). Also, in item 168, such methods automatically place additional raster image processors in the reduced-power sleep mode when the number of pages of the print-ready bitmaps buffered exceeds the buffer maximum, and is predicted to not decrease, using the processor. Correspondingly, in item 170, these methods automatically return one or more of the raster image processors that are in the reduced-power sleep mode to full-power mode when the number of pages of the print-ready bitmaps buffered is predicted to decrease, using the processor.

Thus, the methods herein allow at least some of the raster image processors to proceed to reduced-power mode based on the predicted complexity of the upcoming pages of the print job that are to be rasterized. This reduces the amount of power that is consumed by the devices and the cooling equipment. This also extends the useful life of the raster image processors and cooling equipment by reducing the number of hours such devices are fully powered in an on state.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by printing machines (especially when the volume of data being processed, and the speed at which such data needs to be evaluated is considered). For example, if one were to manually attempt to calculate the bitmap production rate or printing rate performed by the machines discussed above, the manual process would be sufficiently inaccurate and take an excessive amount of time so as to render the manual results useless. Specifically, processes such as receiving electronic data streams, producing bitmaps, printing markings on sheets, etc., requires the utilization of different specialized machines, and humans performing such processing would not produce useful results because of the time lag, inconsistency, and inaccuracy humans would introduce into the results.

Further, such machine-only processes are not mere "post-solution activity" because the conversion of digital information in a print job to bitmaps, use of bitmaps within printing machines, calculations of rasterization, and printing, buffering electronic data, determining amounts of data buffered, etc. are integral with the steps outlined above. Also, the data transmission between the separate computerized devices in the distributed DFE is integral with the process performed by the methods herein, and is not mere post-solution activity. In other words, these various machines are integral with the methods herein because the methods cannot be performed without the machines (and cannot be performed by humans alone).

Additionally, the methods herein solve many highly complex technological problems that require the use of machines. One goal set forth above is to reduce power consumption by selectively placing some (not all) machines in low-power states for limited periods of time, which mandates that machine interaction is integral with this method. For example, raster image processors remain in wasteful full-power mode to ensure that the printing engine does not stop because of the lack of bitmaps. Methods herein solve this technological problem by maintaining the bitmap buffer between a minimum and maximum, yet still allow some of the raster image processors to proceed to reduced-power mode based on the predicted complexity of the upcoming pages of the print job that are to be rasterized. This reduces the amount of power that is consumed by the devices and the cooling equipment. This also extends the useful life of the raster image processors and cooling equipment by reducing the number of hours such devices are fully powered in an on state. By granting such benefits, the methods herein reduce the amount of power needed and extend the useful life of machines, thereby solving a substantial technological problem that printers experience today.

As shown in FIG. 3, exemplary systems and methods herein include various computerized devices 200, and the printing system 100 (described above) located at various different physical locations 206. The computerized devices 200 can include, for example, host computers, which are in communication (operatively connected to one another) by way of a local or wide area (wired or wireless) network 202.

Figure 4:
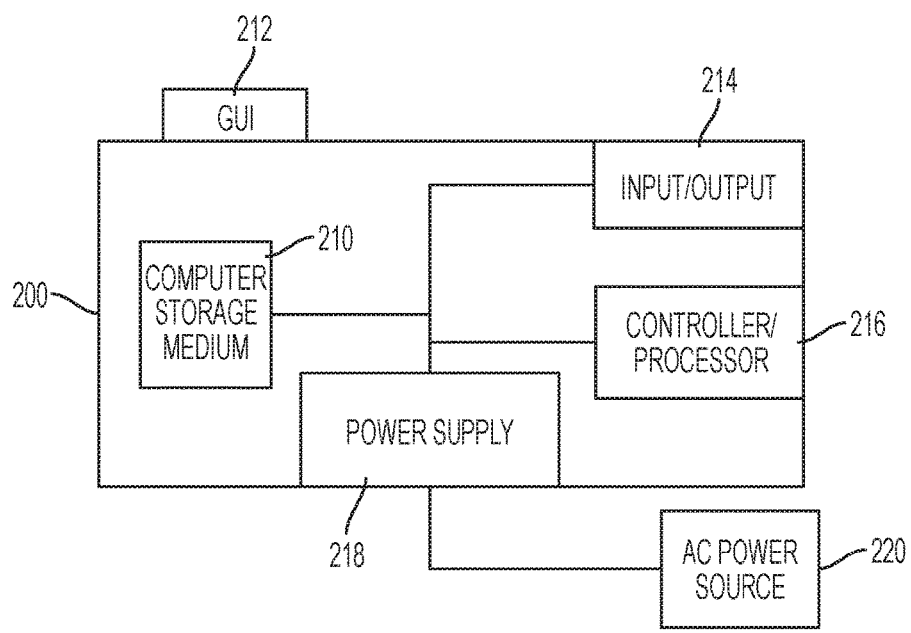
FIG. 4 is a schematic diagram illustrating devices herein.

FIG. 4 illustrates one of the computerized devices 200, which can be for example, a host computer, a frontend computer, a raster image processor, a backend computer, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 4, a body housing has one or more functional components that operate on power supplied from an alternating current (AC) source 220 by the power supply 218. The power supply 218 can comprise a common power conversion unit, power storage element (e.g., a battery, etc), etc.

Figure 5:
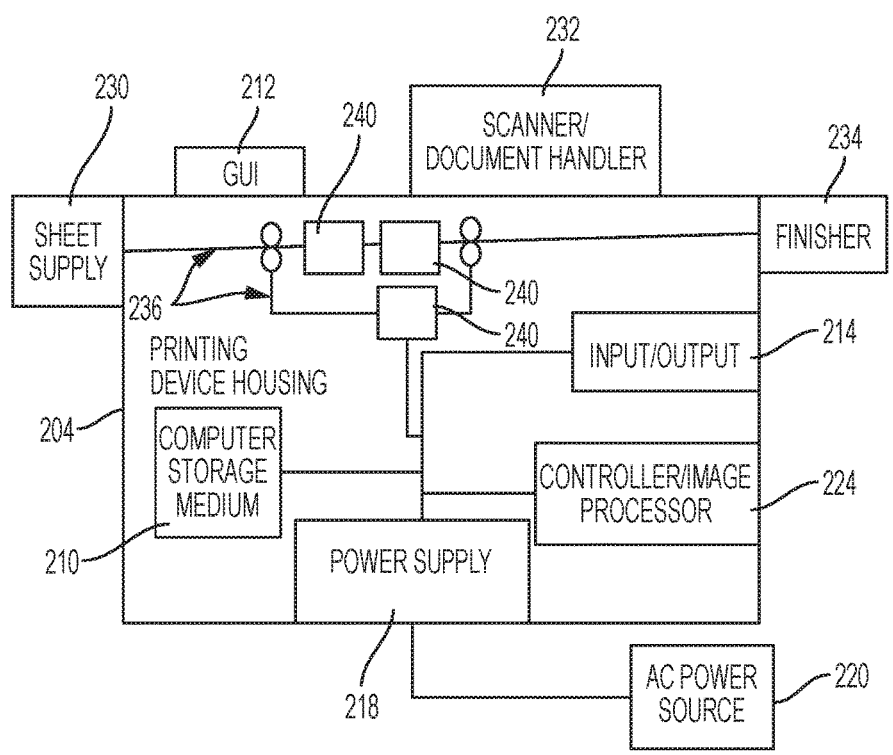
FIG. 5 is a schematic diagram illustrating devices herein.

FIG. 5 illustrates a computerized device that is a printing device 204, which can be used with systems and methods herein and can comprise, for example, a printing engine, printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more marking engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

The print media is transported by the sheet output transport 236 to output trays or a multi-function finishing station 234 performing different desired actions, such as stapling, hole-punching and C or Z-folding, a modular booklet maker, etc., although those ordinarily skilled in the art would understand that the finisher/output tray 234 could comprise any functional unit.

As would be understood by those ordinarily skilled in the art, the printing device 204 shown in FIG. 5 is only one example and the systems and methods herein are equally applicable to other types of printing devices that may include fewer components or more components. For example, while a limited number of printing engines and paper paths are illustrated in FIG. 5, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand. A print job includes a set of data that is to be printed, and can include images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster image processor (RIP) is a component used in a printing system that produces a raster image also known as a bitmap from the print job. The bitmap is then sent to a printing device for output. Raster image processing is the process that turns vector digital information into a high-resolution raster image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

Further, the terms automated or automatically mean that once a process is started (by a machine or a user); one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing system comprising:
   a printing engine;
   a processor electrically connected to said printing engine, said processor supplying print-ready bitmaps to said printing engine; and
   raster image processors electrically connected to said processor,
   said processor receives print jobs from host computer devices and provides pages of said print job to said raster image processors for decomposition to said print-ready bitmaps,
   said raster image processors buffer pages of said print-ready bitmaps waiting to be printed by said printing engine,
   said processor estimates a processing time for said raster image processors to produce said print-ready bitmaps based on a complexity of said pages of said print job,
   said processor compares a printing speed of said printing engine to said processing time to predict whether the number of said pages of said print-ready bitmaps buffered by said raster image processors will increase or decrease, and said processor places one or more of said raster image processors in a reduced-power sleep mode when said number of said pages of said print-ready bitmaps buffered is between a buffer minimum and a buffer maximum, and is predicted to not decrease.

2. The printing system according to claim 1, said processor estimates a processing time for said raster image processors to produce said print-ready bitmaps by evaluating the number and complexity of commands that will be processed to produce said print-ready bitmaps.

3. The printing system according to claim 1, said processor estimates said printing speed based on the current printing speed, scheduled printing supplies replacement, and scheduled employee availability.

4. The printing system according to claim 1, said processor estimates a processing time for said raster image processors to produce said print-ready bitmaps by:
  evaluating page size, page resolution, bandwidth used to transmit pages, resources used for each page, and bit depth; and
  weighting image commands as being more complex than vectors and graphics commands, plus additional weighting for color profile adjustments and artifact adjustments after bitmap creation.

5. The printing system according to claim 1, said processor places additional ones of said raster image processors in said reduced-power sleep mode when said number of said pages of said print-ready bitmaps buffered exceeds said buffer maximum, and is predicted to not decrease.

6. The printing system according to claim 1, said processor returns one or more of said raster image processors that are in said reduced-power sleep mode to a full-power mode when said number of said pages of said print-ready bitmaps buffered is predicted to decrease.

7. The printing system according to claim 1, said raster image processors comprises dedicated processors that only produce said print-ready bitmaps and that are separate from said processor.

8. A printing system comprising:
  a printing engine;
  a backend computer device electrically connected to said printing engine, said backend computer device supplying print-ready bitmaps to said printing engine;
  raster image processing computer devices electrically connected to said backend computer device; and
  a frontend computer device electrically connected to said raster image processing computer devices,
  said frontend computer device receives print jobs from host computer devices and provides pages of said print job to said raster image processing computer devices for decomposition to said print-ready bitmaps,
  said raster image processing computer devices buffer pages of said print-ready bitmaps waiting to be printed by said printing engine,
  said frontend computer device monitors a printing speed of said printing engine,
  said frontend computer device estimates a processing time for said raster image processing computer devices to produce said print-ready bitmaps based on a complexity of said pages of said print job,
  said frontend computer device compares said printing speed to said processing time to predict whether the number of said pages of said print-ready bitmaps buffered by said raster image processing computer devices will increase or decrease,
  said frontend computer device compares said number of said pages of said print-ready bitmaps buffered by said raster image processing computer devices to a buffer minimum and a buffer maximum, and
  said frontend computer device places one or more of said raster image processing computer devices in a reduced-power sleep mode when said number of said pages of said print-ready bitmaps buffered is between said buffer minimum and said buffer maximum, and is predicted to not decrease.

9. The printing system according to claim 8, said frontend computer device estimates a processing time for said raster image processing computer devices to produce said print-ready bitmaps by evaluating the number and complexity of commands that will be processed to produce said print-ready bitmaps.

10. The printing system according to claim 8, said frontend computer device estimates said printing speed based on the current printing speed, scheduled printing supplies replacement, and scheduled employee availability.

11. The printing system according to claim 8, said frontend computer device estimates a processing time for said raster image processing computer devices to produce said print-ready bitmaps by:
  evaluating page size, page resolution, bandwidth used to transmit pages, resources used for each page, and bit depth; and
  weighting image commands as being more complex than vectors and graphics commands, plus additional weighting for color profile adjustments and artifact adjustments after bitmap creation.

12. The printing system according to claim 8, said frontend computer device places additional ones of said raster image processing computer devices in said reduced-power sleep mode when said number of said pages of said print-ready bitmaps buffered exceeds said buffer maximum, and is predicted to not decrease.

13. The printing system according to claim 8, said frontend computer device returns one or more of said raster image processing computer devices that are in said reduced-power sleep mode to a full-power mode when said number of said pages of said print-ready bitmaps buffered is predicted to decrease.

14. The printing system according to claim 8, said raster image processing computer devices comprises dedicated computer devices that only produce said print-ready bitmaps and that are separate from said frontend computer device and said backend computer device.

15. A method comprising:
  receiving print jobs from host computer devices into a processor;
  providing pages of said print job to raster image processors for decomposition to print-ready bitmaps;
  supplying said print-ready bitmaps to a printing engine;
  buffering pages of said print-ready bitmaps waiting to be printed by said printing engine;
  estimating processing time for said raster image processors to produce said print-ready bitmaps based on a complexity of said pages of said print job, using said processor;
  comparing printing speed of said printing engine to said processing time to predict whether the number of said pages of said print-ready bitmaps buffered by said raster image processors will increase or decrease, using said processor;
  comparing said number of said pages of said print-ready bitmaps buffered by said raster image processors to a buffer minimum and a buffer maximum, using said processor; and placing one or more of said raster image processors in a reduced-power sleep mode when said number of said pages of said print-ready bitmaps buffered is between said buffer minimum and said buffer maximum, and is predicted to not decrease, using said processor.

16. The method according to claim 15, said estimating processing time comprises evaluating the number and complexity of commands that will be processed to produce said print-ready bitmaps.

17. The method according to claim 15, further comprising estimating said printing speed based on the current printing speed, scheduled printing supplies replacement, and scheduled employee availability.

18. The method according to claim 15, said estimating processing time comprises:

evaluating page size, page resolution, bandwidth used to transmit pages, resources used for each page, and bit depth; and weighting image commands as being more complex than vectors and graphics commands, plus additional weighting for color profile adjustments and artifact adjustments after bitmap creation.

19. The method according to claim 15, further comprising placing additional ones of said raster image processors in said reduced-power sleep mode when said number of said pages of said print-ready bitmaps buffered exceeds said buffer maximum, and is predicted to not decrease, using said processor.

20. The method according to claim 15, further comprising returning one or more of said raster image processors that are in a reduced-power sleep mode to a full-power mode when said number of said pages of said print-ready bitmaps buffered is predicted to decrease, using said processor.

* * * * *